US009067508B2

(12) United States Patent
Fujii et al.

(10) Patent No.: US 9,067,508 B2
(45) Date of Patent: Jun. 30, 2015

(54) SEAT OCCUPANCY DETERMINATION APPARATUS

(71) Applicant: AISIN SEIKI KABUSHIKI KAISHA, Kariya-shi (JP)

(72) Inventors: Hiroyuki Fujii, Kariya (JP); Takeshi Kuwabara, Gifu (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 133 days.

(21) Appl. No.: 13/764,082

(22) Filed: Feb. 11, 2013

(65) Prior Publication Data

US 2013/0207425 A1 Aug. 15, 2013

(30) Foreign Application Priority Data

Feb. 15, 2012 (JP) ................................ 2012-030851

(51) Int. Cl.
*B60R 22/00* (2006.01)
*E05F 15/00* (2006.01)
*G05D 1/00* (2006.01)
*B60N 2/00* (2006.01)
*B60R 22/48* (2006.01)

(52) U.S. Cl.
CPC .............. *B60N 2/002* (2013.01); *B60R 22/48* (2013.01); *B60R 2022/4858* (2013.01)

(58) Field of Classification Search
USPC ........... 701/31.4, 34.4, 29.1, 45; 180/273, 41; 280/735; 177/136
See application file for complete search history.

(56) References Cited

U.S. PATENT DOCUMENTS 6,957,591 B2 * 10/2005 Takafuji et al. .......... 73/862.391
7,791,462 B2 * 9/2010 Sakai ......................... 340/457.1

FOREIGN PATENT DOCUMENTS

JP          9-207638          8/1997

OTHER PUBLICATIONS

U.S. Appl. No. 13/764,015, filed Feb. 11, 2013, Fujii.
U.S. Appl. No. 13/764,135, filed Feb. 11, 2013, Fujii, et al.
U.S. Appl. No. 13/764,185, filed Feb. 11, 2013, Fujii, et al.

* cited by examiner

*Primary Examiner* — Adam Tissot
(74) *Attorney, Agent, or Firm* — Oblon, McClelland, Maier & Neustadt, L.L.P.

(57) ABSTRACT

A seat occupancy determination apparatus includes first and second load detection portions arranged at one end of a seat in a width direction, a peak value detection portion detecting whether a peak value of a partial load value exists within a first predetermined time period in a case where the partial load value decreases to or below a first threshold value, and a first seat occupancy determination portion shifting a determination to a no occupant state in a case where the peak value is detected and a disengagement of a tongue plate from a buckle is detected within a predetermined time while an occupant seated state is determined. The first seat occupancy determination portion is inhibited from shifting the determination to the no occupant state in a case where the peak value is detected and the disengagement of the tongue plate is inhibited from being detected within the predetermined time.

4 Claims, 7 Drawing Sheets

SEAT OCCUPANCY DETERMINATION APPARATUS

CROSS REFERENCE TO RELATED APPLICATIONS

This application is based on and claims priority under 35 U.S.C. §119 to Japanese Patent Application 2012-030851, filed on Feb. 15, 2012, the entire content of which is incorporated herein by reference.

TECHNICAL FIELD

This disclosure generally relates to a seat occupancy determination apparatus.

BACKGROUND DISCUSSION

In recent years, in order to improve performance of various safety devices, for example, of a seat belt and an airbag provided at a vehicle, operations of such safety devices may be controlled in accordance with a weight of an occupant seated on a seat of the vehicle. For example, in a case where the occupant seated on the seat does not tighten and fasten the seat belt, a warning lamp is generally turned on for indicating that the seat belt is not fastened after the detection that the occupant is seated on the seat. In addition, according to regulations in the North America, an airbag is required to be deployed at a vehicle crash in a state where an adult is seated on a passenger seat. Therefore, correctly and appropriately determining the weight of the occupant is extremely important for a safety aspect.

JP09-207638A discloses an occupancy detection apparatus for determining whether or not an occupant is seated on a vehicle seat by detecting a load applied to the seat. According to the occupancy detection apparatus disclosed in JP09-207638A, two load detection portions are arranged at two seat attachment portions among plural seat attachment portions at which the seat is fixed to a vehicle floor. Whether or not the occupant is seated on the seat is determined on a basis of a sum of two load values obtained from the two load detection portions. The load detection portions are provided at two seat attachment portions as minimum requirements among generally four seat attachment portions, which may lead to a simple configuration and a reduced cost of the occupancy determination apparatus as a whole.

In a case where the load detection portions are provided at front and rear portions of either side of the seat in a width direction thereof, i.e., a right side or a left side of the seat, a decrease of an occupant load when the occupant gets off the vehicle and a decrease of an occupant load when the vehicle is turning, i.e., driven on a curve, is distinguishable as follows. A load applied to the seat decreases for an extremely short time period when the occupant gets off the vehicle while a load applied to the seat decreases gently for a relatively long time period when the vehicle is turning.

Nevertheless, in a case where a steering wheel is sharply turned from side to side on an S-shaped curve at a mountain path or for emergency avoidance, for example, such case will be hereinafter referred to as an S-shaped curve driving, an output of the load applied to the seat may once increase due to a centrifugal force and then decrease. Thus, by the occupant changing a sitting posture at the time of the S-shaped curve driving, an output of a load detection portion rapidly decreases for a short time period, which may similarly indicate a rapid decrease of the occupant load output by the load detection portion when the occupant gets off the vehicle. As a result, it is difficult to distinguish between the decrease of the occupant load while the vehicle is being driven and the decrease of the occupant load when the occupant gets off the vehicle, which may inhibit an accurate determination of whether or not the occupant is seated on the seat.

A need thus exists for a seat occupancy determination apparatus which is not susceptible to the drawback mentioned above.

SUMMARY

According to an aspect of this disclosure, a seat occupancy determination apparatus for selectively determining an occupant seated state in which an occupant is seated on a seat and a no occupant state in which the occupant is not seated on the seat, includes a seat belt detection portion configured to detect an engagement of a tongue plate with a buckle of a seat belt, first and second load detection portions arranged at one end of a lower side of the seat in a width direction thereof in a state where the first and second load detection portions are positioned away from each other, each of the first and second load detection portions detecting a portion of a load applied to the seat, a peak value detection portion detecting whether a peak value of a partial load value obtained on a basis of detection values of the first and second load detection portions exists within a first predetermined time period in a case where the partial load value decreases to or below a first threshold value, the first predetermined time period existing before a detection of the first threshold value, and a first seat occupancy determination portion shifting a determination to the no occupant state in a case where the peak value is detected by the peak value detection portion and a disengagement of the tongue plate from the buckle is detected by the seat belt detection portion within a predetermined time before or after a point at which the peak value is detected while the occupant seated state is determined. The first seat occupancy determination portion is inhibited from shifting the determination to the no occupant state in a case where the peak value is detected by the peak value detection portion and the disengagement of the tongue plate from the buckle is inhibited from being detected by the seat belt detection portion within the predetermined time before or after the point at which the peak value is detected.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A seat occupancy determination apparatus 10 for a vehicle seat 100 serving as a seat according to an embodiment will be explained with reference to the attached drawings. In the embodiment, directions and orientations, for example, front, rear, left, right, top, and bottom, correspond to those when viewed from an occupant seated on the vehicle seat 100. In addition, according to the embodiment, a vehicle to which the vehicle seat 100 is mounted is a left-hand drive car. Then, whether or not the occupant is seated on a passenger seat is determined according to the embodiment.

Figure 1:
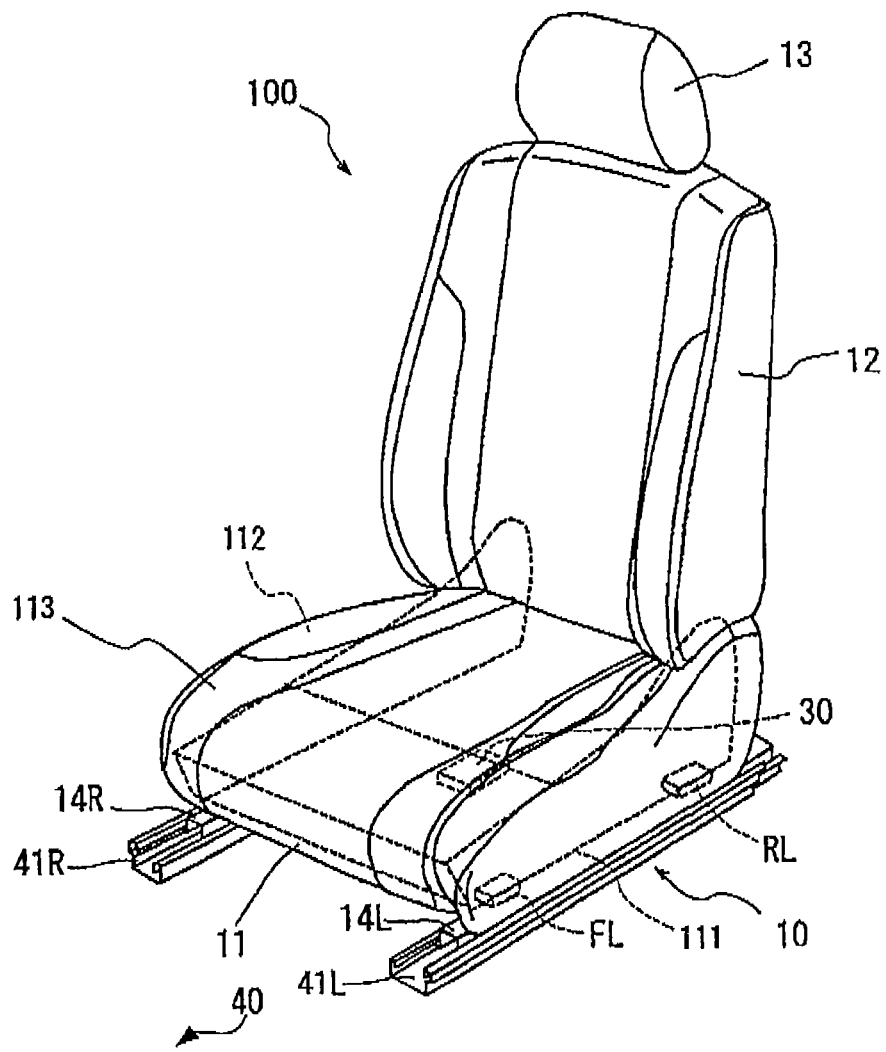
FIG. 1 is a perspective view of a vehicle seat where a seat occupancy determination apparatus according to an embodiment disclosed here is applied.

As illustrated in FIG. 1, the vehicle seat 100 serving as the passenger seat includes a seat cushion 11 on which the occupant is seated, and a seatback 12 serving as a backrest for the occupant and attached to a rear end portion of the seat cushion 11 so as to be rotatable in a front-rear direction of the vehicle (i.e., of the vehicle seat 100). In addition, a headrest 13 supporting the head portion of the occupant is attached to an upper edge of the seatback 12.

The seat cushion 11 includes a seat frame 111, a pad member 112 provided at an upper side of the seat frame 111, and a surface portion 113 covering a surface of the pad member 112. A pair of upper rails, i.e., left and right upper rails 14L and 14R, is attached to a lower surface of the seat frame 111. The left and right upper rails 14L and 14R engage with a pair of lower rails, i.e., left and right lower rails 41L and 41R, fixed to a vehicle floor 40 so as to be movable in the front-rear direction. Accordingly, the vehicle seat 100 is movable on the vehicle floor 40 in the front-rear direction and may be locked to a desired position by the occupant.

Next, the seat occupancy determination apparatus 10 will be explained below. The seat occupancy determination apparatus 10 includes a seat belt apparatus 60 (see FIG. 2) serving as a three-point seat belt (a seat belt). The seat belt apparatus 60 includes an ALR (Automatic Locking Retractor) mechanism. As illustrated in FIG. 3, the seat occupancy determination apparatus 10 includes a front load detection portion FL serving as a first load detection portion, a rear load detection portion RL serving as a second load detection portion, a buckle switch 65 serving as a seat belt detection portion, an airbag display lamp 35, and a control unit 30.

The front and rear load detection portions FL and RL are provided between the seat frame 111 and the left upper rail 14L in a vertical direction of the vehicle (i.e., of the vehicle seat 100) as illustrated in FIG. 1. Specifically, the front and rear load detection portions FL and RL are positioned close to a center of the vehicle in a width direction thereof in a state where the front and rear load detection portions FL and RL are separated by a predetermined distance in the front-rear direction. The front load detection portion FL is provided at a front side relative to a center of the seat cushion 11 in the front-rear direction while the rear load detection portion RL is provided at a rear side relative to the center of the seat cushion 11 in the front-rear direction.

Each of the frond and rear load detection portions FL and RL is a load sensor constituted by a strain gauge, for example. According to the embodiment, types, models, or detection principles, for example, are not specified.

The front load detection portion FL is disposed between a front portion of the seat frame 111 and the left upper rail 14L to detect a front load value Ff applied to a front left portion of the seat cushion 11. In the same way, the rear load detection portion RL is disposed between a rear portion of the seat frame 111 and the left upper rail 14L and is provided in the vicinity of a buckle 64 (see FIG. 2) supported by the vehicle seat 100 to detect a rear load value Rf applied to a rear left portion of the seat cushion 11. The front load value Ff serves as a first load value while the rear load value Rf serves as a second load value.

Each of the front and rear load detection portions FL and RL outputs a positive detection signal in a case where a load in a downward direction (i.e., a downward load) is applied to the seat cushion 11 by the occupant seated on the vehicle seat 100, for example. Each of the front and rear load detection portions FL and RL outputs a negative detection signal in a case where a load in an upward direction (i.e., an upward load) is applied to the seat cushion 11. In a factory setting, a zero point adjustment is performed on each of the front and rear load detection portions FL and RL.

As illustrated in FIG. 3, the front load detection portion FL includes a sensor portion 21F and an amplifier portion 22F amplifying a detection signal generated by the sensor portion 21F. In addition, the rear load detection portion RL includes a sensor portion 21R and an amplifier portion 22R amplifying a detection signal generated by the sensor portion 21R. Each of the sensor portions 21F and 21R is constituted by a Wheatstone bridge including four strain gauges.

The front and rear load detection portions FL and RL are connected to the control unit 30 to which the buckle switch 65 and the airbag display lamp 35, for example, are connected. The control unit 30 includes an A/D converter 31 performing a digital conversion on an analog detection signal from each of the front and rear load detection portions FL and RL, and a calculation portion 32 inputting the detection signal from each of the front and rear load detection portions FL and RL. The calculation portion 32 includes a front and rear total load value calculation portion serving as a total load value calculation portion for calculating a front and rear total load value (Ff+Rf) serving as a total load value by adding the front load value Ff detected by the front load detection portion FL and the rear load value Rf detected by the rear load detection portion RL. The front and rear total load value (Ff+Rf) corresponds to a partial load value Wn.

The control unit 30 also includes a storage portion 33 storing various data for determining an occupancy state of the vehicle seat 100, for example, storing the front and rear total load value calculated by the calculation portion 32, a seat occupancy determination portion 34 determining whether or not the occupant is seated on the vehicle seat 100 based on various data stored in the storage portion 33, and a peak value detection portion 36 detecting a peak value of the partial load value Wn based on data stored at the storage portion 33. The front load value Ff, the rear load value Rf, and the front and rear total load value (Ff+Rf) are stored at the storage portion 33 and thereafter are transmitted to the seat occupancy determination portion 34.

The control unit 30 inputs signals from the load detection portions FL, RL and the buckle switch 65 (i.e., the seat belt detection portion) to determine the occupancy state of the vehicle seat 100. Specifically, the seat occupancy determination portion 34 determines, by means of determination processes which will be explained later, an "occupant seated state" in which the occupant is seated on the vehicle seat 100 or a "no occupant state" in which the occupant is not seated on the vehicle seat 100 to thereby control the airbag display lamp 35.

Figure 2:
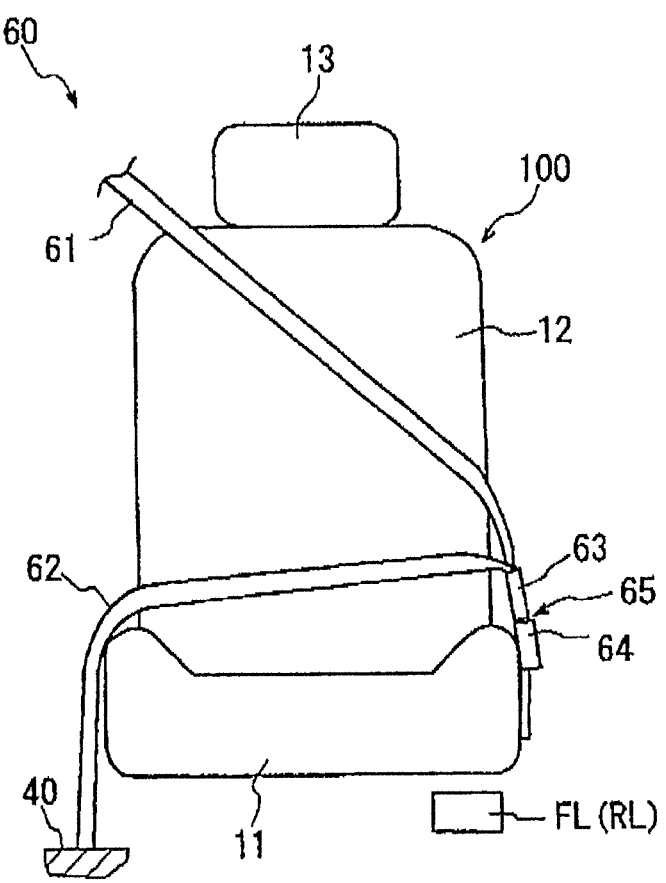
FIG. 2 is a front view of the vehicle seat illustrating a seat belt detection portion according to the embodiment.
Figure 3:
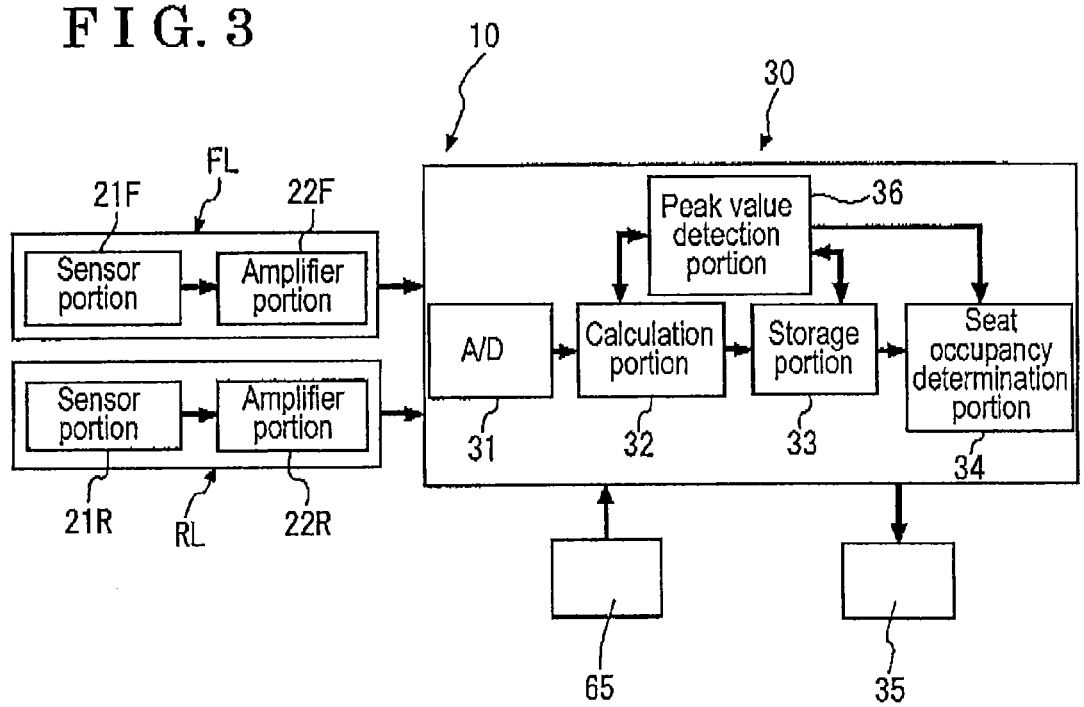
FIG. 3 is a block diagram of the seat occupancy determination apparatus according to the embodiment.

The seat belt apparatus 60 serving as the seat belt includes a shoulder strap 61 and a lap strap 62 connected to each other at respective ends by a tongue plate 63, and the buckle 64 as illustrated in FIG. 2. The buckle 64 engages with or disengages from the tongue plate 63 so as to form the buckle switch 65.

A retractor (i.e., a wind-up device) is arranged within a pillar that is positioned at a right side of the vehicle seat 100. An upper end of the shoulder strap 61 is connected to the retractor. The shoulder strap 61 is configured to be rolled out against a wind-up force of the retractor.

One end of the lap strap 62 is fixed to the vehicle floor 40 at a right side of the vehicle seat 100. The buckle 64, which is supported to a left rear side of the vehicle seat 100, includes a hole that opens upward. The tongue plate 63 connected to the Shoulder strap 61 and the lap strap 62 is inserted into the hole of the buckle 64 to engage with the buckle 64.

According to the present embodiment, the buckle 64 is arranged at the same side of the vehicle seat 100 in the width direction as the side where the front and rear load detection portions FL and RL are arranged. Therefore, the front and rear load detection portions FL and RL detect not only the weight of the occupant seated on the vehicle seat 100 but also the downward load applied to the buckle 64 and the upward load applied by the pulling of the seat belt apparatus 60 when the occupant fastens the seat belt apparatus 60.

According to the present embodiment, the front and rear load detection portions FL and RL are arranged at front and rear portions of an inner side of the vehicle seat 100 in the width direction. Therefore, each output of the load detection portions FL and RL varies depending on whether the occupant is seated on the vehicle seat 100 or is separated from the vehicle seat 100 for getting off the vehicle, or varies depending on whether the vehicle turns a left curve or a right curve.

That is, at a time of driving on a left curve, the vehicle seat 100 at the passenger seat side and the occupant seated on the vehicle seat 100 bounce and move to the right by a centrifugal force, which results in a decrease of the output of each of the load detection portions FL and RL. On the other hand, at a time of driving on a right curve, the output of each of the load detection portions FL and RL increases.

Figure 4:
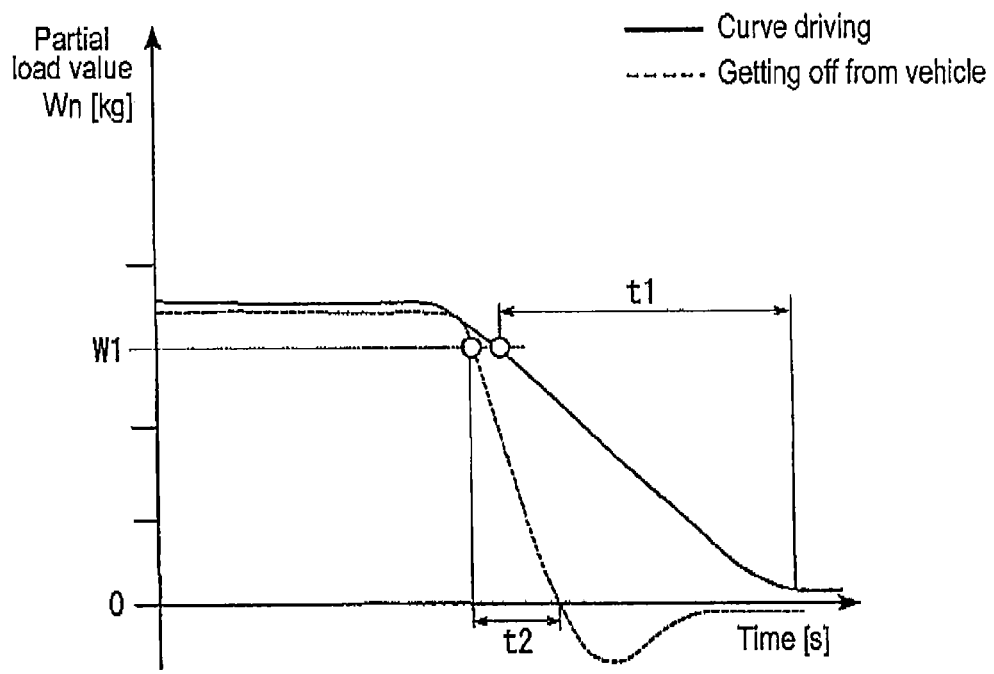
FIG. 4 is a graph illustrating a decrease of a load applied to the vehicle seat at a time of a normal curve driving of a vehicle and in a case where an occupant gets off the vehicle.

As illustrated in FIG. 4, in a usual case where the vehicle enters the curve in one direction, an inclination of a decrease of the load applied to the vehicle seat 100 is gentle. For example, time t1 for the load decrease from a point at which a first threshold value W1 is detected is long. On the other hand, the inclination of the load decrease is relatively sharp when the occupant gets off the vehicle. For example, time t2 for the load decrease from the point at which the first threshold value W1 is detected is short.

Therefore, whether the load decrease is caused by the turning of the vehicle or by the occupant getting off the vehicle is determined on a basis of whether the inclination of the load decrease is gentle or sharp.

Nevertheless, in a case where a steering wheel is sharply turned from side to side on an S-shaped curve at a mountain path or for emergency avoidance, for example, such case will be hereinafter referred to as an S-shaped curve driving, an output of the load (load output) applied to the vehicle seat 100 may once increase due to a centrifugal force and then decrease. Thus, by the occupant changing a sitting posture at the time of the S-shaped curve driving, the output of each of the load detection portions FL and RL rapidly decreases for a short time period, which may similarly indicate rapid decrease characteristics of the load output by each of the load detection portions FL and RL when the occupant gets off the vehicle. As a result, it is difficult to distinguish between the decrease of the load while the vehicle is being driven and the decrease of the load when the occupant gets off the vehicle, which may inhibit an accurate determination of whether or not the occupant is seated on the vehicle seat 100.

Figure 6:
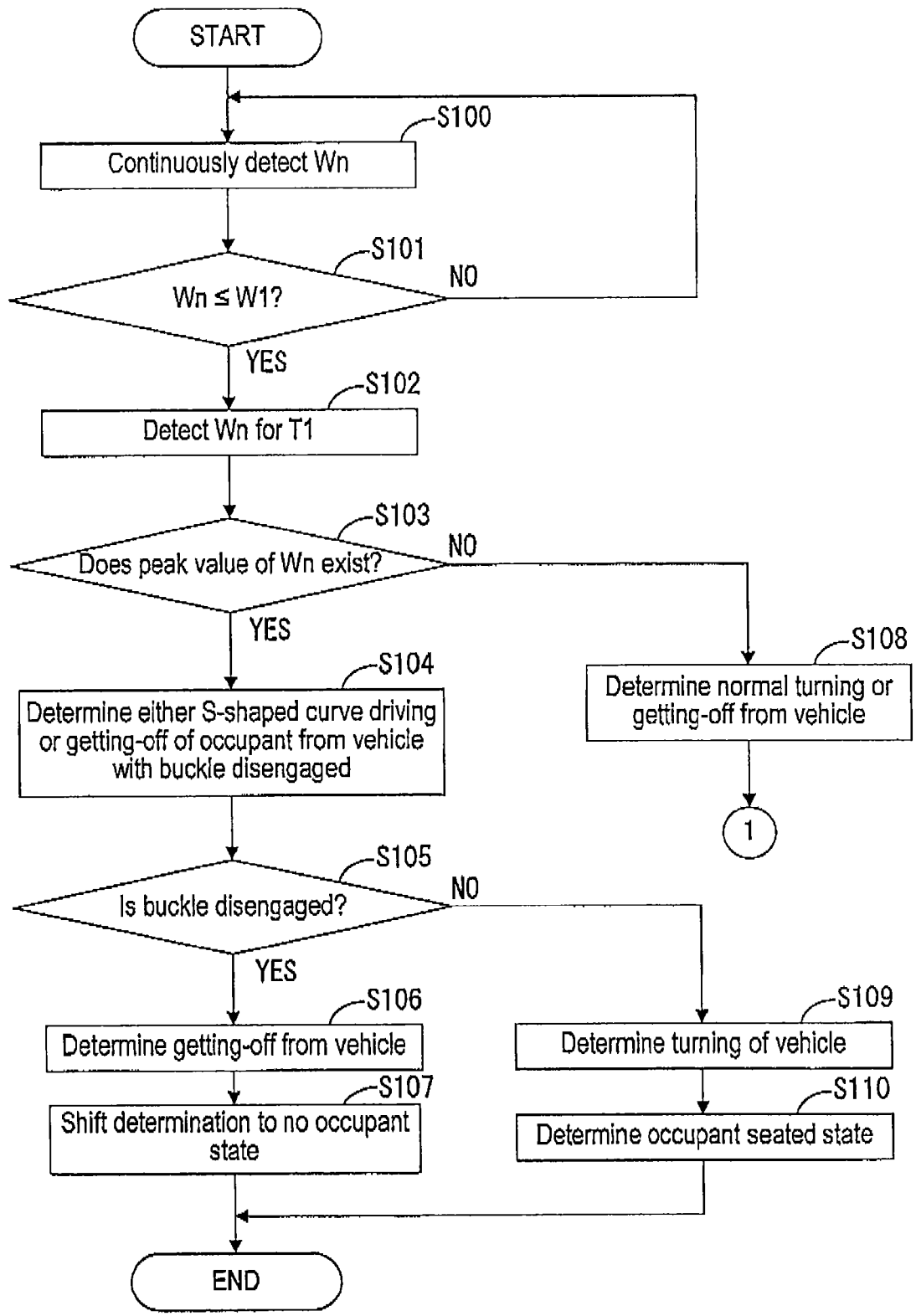
FIG. 6 is a flowchart of a determination process for determining the S-shaped curve driving or the getting-off of the occupant from the vehicle.

Therefore, according to the seat occupancy determination apparatus 10 of the embodiment, the determination of whether or not the occupant is seated on the vehicle seat 100 is performed by a determination process illustrated by a flow in FIG. 6.

First, in step S100 (hereinafter "step" will be omitted), the control unit 30 continuously detects a load value by the front and rear load detection portions FL and RL. A detected load value (Ff, Rf) is calculated at the calculation portion 32 to obtain the partial load value Wn. That is, the partial load value Wn is obtained by adding the front load value Fr and the rear load value Rf. According to the present embodiment, the front and rear total load value is the partial load value.

In S101, the control unit 30 determines whether or not the partial load value Wn detected in S100 decreases to the first threshold value W1. In a case where the positive determination is made in S101, the partial load value Wn is continuously backwardly detected to a point (F01 or F02, see FIG. 5) at which the partial load value Wn becomes equal to the first threshold value W1. That is, the partial load value Wn is continuously detected for a first predetermined time period T1 in S102. The first predetermined time period T1 exists and continues before the detection of the first threshold value W1. In a case where the negative determination is made in S101, the flow returns to S100 to continuously detect the partial load value Wn.

In S103, the control unit 30 determines whether or not a peak value P1 or P2 of the partial load value Wn exists in a load range equal to or greater than the first threshold value W1. For example, the control unit 30 detects whether the peak value P1 is present within the first predetermined time period T1 to the point F01 or whether the peak value P2 is present within the first predetermined time period T1 to the point F02. Each of the peak values P1 and P2 is obtained as follows. First, a difference between adjacent two values among plural partial load values Wn detected from data in the storage portion 33 per predetermined time period is detected and the partial load value Wn obtained at a point at which a sign (i.e., plus or minus sign) of a value of the difference is reversed is defined to be the peak value P1 or P2.

Figure 8:
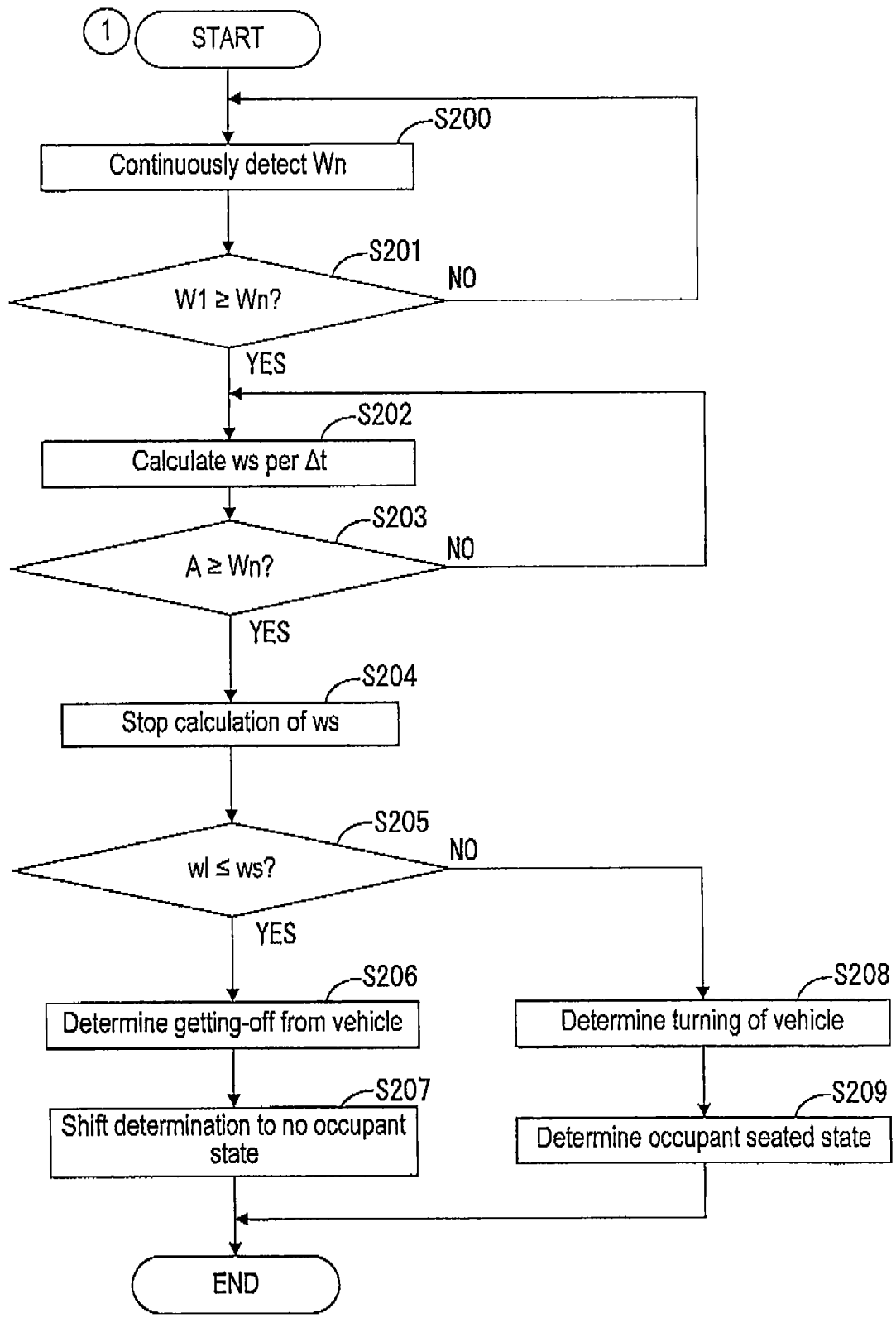
FIG. 8 is a flowchart of a determination process for determining the normal curve driving or the getting-off of the occupant from the vehicle.

In a case where the positive determination is made in S103, the control unit 30 determines either the S-shaped curve driving in which a vehicle driver sharply or steeply turns a steering wheel from side to side, or the occupant shifting his/her weight to right and left on the vehicle seat 100 so as to disengage the tongue plate 63 from the buckle 64 in S104. The flow then proceeds to S105. In a case where the negative determination is made in S103, it is determined in S108 that the vehicle turns on a curve in one direction (i.e., a usual or normal turning of the vehicle) or the occupant gets off the vehicle in a state where the seat belt apparatus 60 is unfastened, for example. Then, another determination process is initiated for determining whether the vehicle is turning on a curve or the occupant gets off the vehicle as illustrated in FIG. 8.

Figure 5:
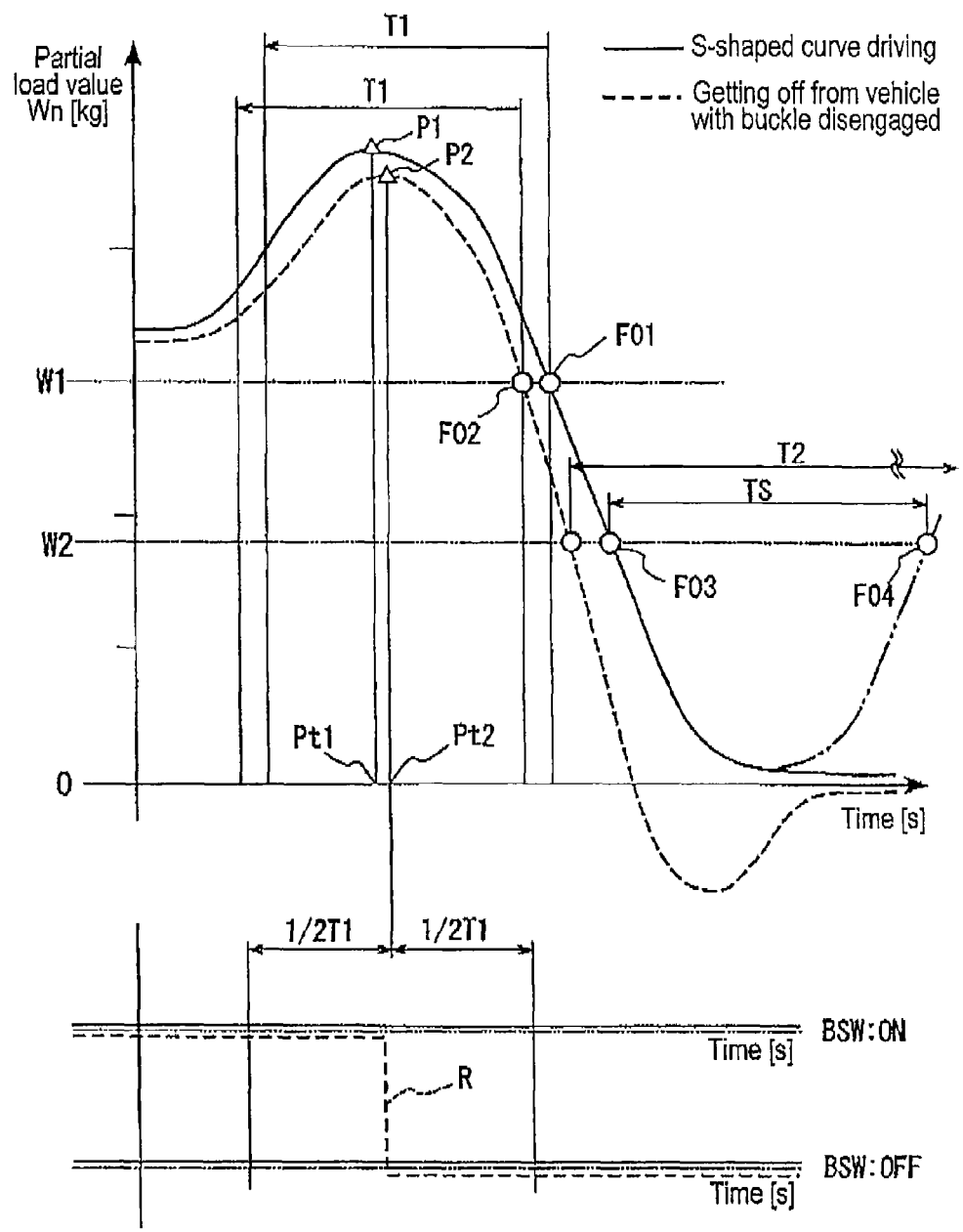
FIG. 5 is a graph illustrating a decrease of a load applied to the vehicle seat at a time of an S-shaped curve driving and in a case where the occupant gets off the vehicle with a seat belt apparatus disengaged.

Next, in S105, the control unit 30 determines whether or not the buckle switch 65 detects a separation R (i.e., off state of the buckle switch 65) of the tongue plate 63 from the buckle 64 within a predetermined time around a point at which the peak value P1 or P2 is detected. For example, the predetermined time corresponds to a half of the first predetermined time period T1 before a peak value detection point Pt1 or Pt2 (i.e., $-\frac{1}{2}$T1), or a half of the first predetermined time period T1 after the peak value detection point Pt1 or Pt2 (i.e., ½T1) as illustrated in FIG. 5. For example, the control unit 30 may confirm the separation R within the half of the first predetermined time period T1 before the point Pt2. In a case where the positive determination is made in S105, the control unit 30 determines the getting off of the occupant from the vehicle by the seat occupancy determination portion 34 serving as a first seat occupancy determination portion in S106. As a result, the determination of the control unit 30, specifically, of the seat occupancy determination portion 34, is shifted to the no occupant state in S107 to thereby turn off the airbag display lamp 35 which is turned on when the occupant seated state is determined.

In a case where the negative determination is made in S105, the control unit 30 determines the S-shaped curve driving by the seat occupancy determination portion 34 in S109. The control unit 30 determines the occupant seated state to inhibit the determination from being shifted to the no occupant state while maintaining the airbag display lamp 35, for example, to be turned on in S110.

Figure 7:
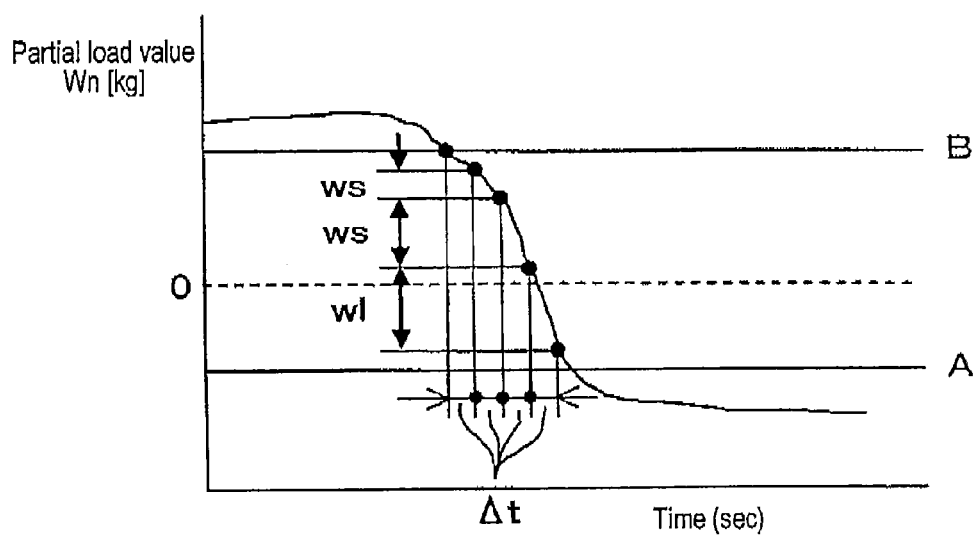
FIG. 7 is a graph illustrating an example of a decrease of a load applied to the vehicle seat.

The determination process in a case where the negative determination is made in S103, i.e., in a case where it is determined that the vehicle turns on a curve in one direction (the normal turning of the vehicle) or the occupant gets off the vehicle in a state where the seat belt apparatus 60 is unfastened, for example, will be explained with reference to FIGS. 7 and 8. According to the aforementioned determination process, whether the load decrease is caused by the turning of the vehicle or caused by the getting off of the occupant from the vehicle is determined on a basis of whether the inclination of the load decrease is sharp or gentle.

As illustrated in FIG. 8, the control unit 30 starts continuously detecting the partial load value Wn (=Ff+Rf) based on the front load value Ff and the rear load value Rf detected by the front load detection portion FL and the rear load detection portion RL respectively in S200.

Next, the control unit 30 determines whether the partial load value Wn is equal to or smaller than the first threshold value W1 serving as a threshold value B (see FIG. 7) in S201.

In a case where it is determined that the partial load value Wn is equal to or smaller than the first threshold value W1, the control unit 30 detects the partial load value Wn per time Δt within a monitoring range, i.e., a range smaller than the first threshold value W1, so as to continuously calculate a reduction ws (see FIG. 7) of the partial load value Wn per time Δt.

Next, the control unit 30 determines whether the partial load value Wn is equal to or smaller than, for example, a threshold value A (see FIG. 7) in S203.

In a case where it is determined that the partial load value Wn is equal to or smaller than the threshold value A, the control unit 30 stops calculating the reduction ws per time Δt in S204.

The control unit 30 then determines whether the reduction ws of the partial load value Wn calculated per time Δt is equal to or greater than a predetermined reduction wl in S205. For example, the predetermined reduction wl is substantially one third of the first threshold value W1.

In a case where the load decrease equal to or greater than the predetermined reduction wl is present, the load decrease is sharp and thus it is determined that the load decrease is caused by the occupant getting off the vehicle in S206. The determination is shifted to the no occupant state in S207. Because the determination is shifted to the no occupant state, an operation device or a display lamp, for example, which are kept turned on when the occupant seated state is determined, is turned off.

On the other hand, in a case where the reduction ws of the partial load value Wn is smaller than the predetermined reduction wl, the load decrease of the partial load value Wn is gentle and thus it is determined that the load decrease is caused by the turning of the vehicle. In S209, the determination is inhibited from being shifted to the no occupant state. Accordingly, the airbag display lamp 35, for example, is continuously turned on.

In a case where the getting-off of the occupant from the vehicle is not determined by the seat occupancy determination portion 34 (specifically, the first seat occupancy determination portion) even though the occupant actually gets off the vehicle, the airbag display lamp 35 that is turned on when the occupant seated state is determined is kept turned on, which cause the driver of the vehicle to feel anxiety that an airbag may be broken.

Thus, a condition for certainly shifting the determination to the no occupant state after the occupant gets off the vehicle may be desirably specified so that the airbag display lamp 35 is inhibited from keeping turned on after the occupant gets off the vehicle.

Accordingly, in a case where the buckle 64 is in a disengaged state and a state in which the partial load value Wn (=Ff+Rf) is equal to or smaller than a second threshold value W2, which is smaller than the first threshold value W1, continues for a second predetermined time period T2, the control unit 30 determines that the occupant gets off the vehicle by the seat occupancy determination portion 34 serving as a second seat occupancy determination portion. That is, the control unit 30 performs an occupant getting-off determination. The determination may be shifted from the occupant seated state to the no occupant state.

The second predetermined time period T2 will be explained with reference to FIG. 5. During the S-shaped curve driving, in a case where the steering wheel is first turned to the right so that the vehicle turns a right curve, the partial load value Wn detected by the front and rear load detection portions FL and RL arranged at the inner side in the width direction of the passenger seat of the left-hand drive vehicle once increases to form the peak value P1. The partial load value Wn gradually decreases towards the end of the right turning. When the right turning of the vehicle is finished and the vehicle starts turning a left curve, the partial load value Wn rapidly decreases. The first threshold value W1 is detected at the point F01 during the rapid decrease of the partial load value Wn, and the second threshold value W2 is detected at a point F03 during a first half of the left turning of the vehicle. The second threshold value W2 is again detected at a point F04 during a second half of the left turning of the vehicle, which is indicated by an alternate long and two short dashes line in FIG. 5. Accordingly, time TS that continues during the S-shaped curve driving in a state where the partial load value Wn is equal to or smaller than the second threshold value W2 corresponds to time required for one left turning of the vehicle at the maximum. Thus, even though time required for one turning of the vehicle in the S-shaped curve at a mountain path is considered to be several seconds, the second predetermined time period T2 is defined to be a few ten seconds according to the present embodiment so that the occupant getting-off determination is finally performed on a case in which the determination is not yet shifted to the no occupant state after the various determination processes are performed.

Accordingly, even in a case where the getting-off of the occupant is not determined in a severe getting-off mode of the occupant from the vehicle, for example, the load value is unstable because of a strong wind so that the getting-off of the occupant is not determined even though the occupant gets off the vehicle, the occupant slowly gets off the vehicle, or the occupant gets off the vehicle while applying the load to the right end of the vehicle seat 100, the determination may be shifted to the no occupant state after the elapse of a few ten seconds.

According to the seat occupancy determination apparatus including the aforementioned configuration, in a case where the peak value P1 or P2 is detected within the first predetermined time period T1 before the point F01 or F02 at which the first threshold value W1 is detected, it may be considered that the occupant gets off the vehicle by disengaging the tongue plate 63 from the buckle 64 or the S-shaped curve driving is performed. Only the detection of the peak value P1 or P2 of the first threshold value W1 is unable to determine whether the occupant gets off the vehicle by disengaging the tongue plate 63 from the buckle 64 or the S-shaped curve driving is performed.

Nevertheless, according to the present embodiment, in a case where the separation R of the tongue plate 63 from the buckle 64 is detected within the predetermined time before or after the detection of the peak value P2 (i.e., within the half of T1 before the point Pt2 or the half of T1 after the point Pt2), it is determined that the occupant gets off the vehicle by disengaging the tongue plate 63 from the buckle 64 so that the determination is shifted to the no occupant state. In a case where the separation R of the tongue plate 63 from the buckle 64 is not detected within the predetermined time before or after the detection of the peak value P1 (i.e., within the half of T1 before the point Pt1 or the half of T1 after the point Pt1), it is determined that the vehicle is in the S-shaped curve driving and thus the determination is inhibited from being shifted to the no occupant state.

Accordingly, whether the occupant gets off the vehicle or the vehicle is in the S-shaped curve driving, which may not be determined or distinguished on a basis of whether the reduction of the partial load value is sharp or gentle, may be accurately determined. For example, a wrong determination in which the getting-off of the occupant is determined because the reduction of the partial load value is rapid due to the S-shaped curve driving, which leads to turning-off of the operation device, for example, may be inhibited.

In addition, a wrong determination in which the occupant seated state is determined because the S-shaped curve driving is determined even though the occupant gets off the vehicle when the peak value is detected within the first predetermined time period T1, which leads to the inhibition of the operation device from turning off, may be inhibited.

Further, according to the present embodiment, the seat occupancy determination portion 34 serving as the second seat occupancy determination portion is provided for shifting the determination to the no occupant state in a state where the determination is not shifted to the no occupant state by the seat occupancy determination portion 34 serving as the first seat occupancy determination portion, in a case where a state in which the partial load value Wn obtained on a basis of a portion of the load detected by each of the front and rear load detection portions FL and RL is equal to or smaller than the second threshold value W2 that is smaller than the first threshold value W1 continues for the second predetermined time period T2 that is longer than a time period in which the S-shaped curve driving is performed. Thus, even in a case where the getting off of the occupant from the vehicle is not determined by the first seat occupancy determination portion, the determination may be shifted to the no occupant state by the second seat occupancy determination portion.

The partial load value Wn corresponding to the front and rear total load value (Ff+Rf) obtained by the addition of the front load value Ff and the rear load value Rf is used for determining whether or not the occupant is seated on the vehicle seat 100. Then, variations in the load in the right and left direction of the vehicle seat 100 are added for the determination to thereby enhance accuracy of the determination. The variations in the load applied to the vehicle seat 100 by the S-shaped curve driving or the getting-off of the occupant from the vehicle having a large influence on the variations in the load in the right and left direction of the vehicle seat 100 may be accurately detected.

According to the aforementioned embodiment, the front load detection portion FL and the rear load detection portion RL are separately arranged at the front and rear portions of the inner side of the passenger seat for a left-hand drive car. Alternatively, the front load detection portion FL and the rear load detection portion RL may be separately arranged at the front and rear portions of the inner side of the passenger seat for a right-hand drive car. In this case, the load value detected by the load detection portions FL and RL decreases when the vehicle is turning a right curve. In addition, the load detection portions FL and RL may be separately arranged at the front and rear portions of an outer side (i.e., close to a window) of the passenger seat.

According to the aforementioned embodiment, the partial load value is the front and rear total load value obtained by the addition of the front load value detected by the front load detection portion FL and the rear load value detected by the rear load detection portion RL. Alternatively, for example, the partial load value may be an average value of the front load value detected by the front load detection portion FL and the rear load value detected by the rear load detection portion RL. At this time, the calculation portion 32 includes an average calculation portion obtaining the average value of a portion of the load detected by the front and rear load detection portions FL and RL.

The operation device which is turned off when the determination is shifted to the no occupant state is not limited to the airbag display lamp 35 and may be a room lamp, for example, that is turned on when the occupant is seated on the seat.

According to the aforementioned embodiment, the peak value P1 or P2 is detected on a basis of a point at which a sign (i.e., plus or minus sign) of a value of a difference between the adjacent partial load values is reversed. Alternatively, for example, the peak value P1 or P2 may be obtained when a change rate of the partial load value turns to zero.

The present embodiment is not limited to have the aforementioned configurations and may be appropriately modified or changed accordingly.

According to the aforementioned embodiment, the seat occupancy determination apparatus includes the second seat occupancy determination portion (the seat occupancy determination portion 34) shifting the determination to the no occupant state in a case where a state in which the partial load value Wn is equal to or smaller than the second threshold value W2 that is smaller than the first threshold value W1 continues for the second predetermined time period T2 that is longer than a time period in which the S-shaped curve driving is performed in a state where the determination is inhibited from being shifted to the no occupant state by the first seat occupancy determination portion (the seat occupancy determination portion 34).

In addition, according to the aforementioned embodiment, the seat occupancy determination apparatus includes the front and rear total load value calculation portion calculating the front and rear total load value (Ff+Rf) by adding the front load value Ff serving as a portion of a load detected by the front load detection portion FL and the rear load value Rf serving as a portion of a load detected by the rear load detection portion RL. The partial load value Wn is the front and rear total load value (Ff+Rf).

Further, according to the aforementioned embodiment, the seat occupancy determination apparatus includes the average calculation portion calculating the average value of a portion of a load detected by the front load detection portion FL and a portion of a load detected by the rear load detection portion RL. The partial load value Wn is the average value.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat occupancy determination apparatus for selectively determining an occupant seated state in which an occupant is seated on a seat and a no occupant state in which the occupant is not seated on the seat, comprising:
   a seat belt detection portion configured to detect an engagement of a tongue plate with a buckle of a seat belt;
   first and second load detection portions arranged at one end of a lower side of the seat in a width direction thereof in a state where the first and second load detection portions are positioned away from each other, each of the first and second load detection portions detecting a portion of a load applied to the seat;
   a peak value detection portion detecting whether a peak value of a partial load value obtained on a basis of detection values of the first and second load detection portions exists within a first predetermined time period in a case where the partial load value decreases to or below a first threshold value, the first predetermined time period existing before a detection of the first threshold value;
   a first seat occupancy determination portion shifting a determination to the no occupant state in a case where the peak value is detected by the peak value detection portion and a disengagement of the tongue plate from the buckle is detected by the seat belt detection portion within a predetermined time before or after a point at which the peak value is detected while the occupant seated state is determined,
   the first seat occupancy determination portion being inhibited from shifting the determination to the no occupant state in a case where the peak value is detected by the peak value detection portion and the disengagement of the tongue plate from the buckle is inhibited from being detected by the seat belt detection portion within the predetermined time before or after the point at which the peak value is detected; and
   a total load value calculation portion calculating a total load value by adding a first load value serving as a portion of a load detected by the first load detection portion and a second load value serving as a portion of a load detected by the second load detection portion, wherein the partial load value is the total load value.

2. The seat occupancy determination apparatus according to claim 1, further comprising a second seat occupancy determination portion shifting the determination to the no occupant state in a case where a state in which the partial load value is equal to or smaller than a second threshold value that is smaller than the first threshold value continues for a second predetermined time period that is longer than a time period in which an S-shaped curve driving is performed in a state where the determination is inhibited from being shifted to the no occupant state by the first seat occupancy determination portion.

3. The seat occupancy determination apparatus according to claim 1, further comprising an average calculation portion calculating an average value of a portion of a load detected by the first load detection portion and a portion of a load detected by the second load detection portion, wherein the partial load value is the average value.

4. The seat occupancy determination apparatus according to claim 2, further comprising an average calculation portion calculating an average value of a portion of a load detected by the first load detection portion and a portion of a load detected by the second load detection portion, wherein the partial load value is the average value.

* * * * *